United States Patent
Minetomo et al.

(10) Patent No.: US 12,159,071 B2
(45) Date of Patent: Dec. 3, 2024

(54) INFORMATION PROCESSING SYSTEM, INFORMATION PROCESSING APPARATUS, AND CONTROL METHOD FOR SETTING A SECURITY POLICY TO BE MANAGED DEPENDING ON CIRCUMSTANCES AT DIFFERENT TIMES

(71) Applicant: CANON KABUSHIKI KAISHA, Tokyo (JP)

(72) Inventors: Yuki Minetomo, Kanagawa (JP); Nobuhiro Tagashira, Chiba (JP); Takami Eguchi, Tokyo (JP); Ayuta Kawazu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/350,674

(22) Filed: Jul. 11, 2023

(65) Prior Publication Data
US 2024/0020069 A1     Jan. 18, 2024

(30) Foreign Application Priority Data

Jul. 13, 2022 (JP) .................................. 2022-112600

(51) Int. Cl.
*G06F 3/12* (2006.01)

(52) U.S. Cl.
CPC .......... *G06F 3/1222* (2013.01); *G06F 3/1231* (2013.01); *G06F 3/1286* (2013.01); *G06F 3/1287* (2013.01)

(58) Field of Classification Search
None
See application file for complete search history.

(56) References Cited

FOREIGN PATENT DOCUMENTS

| JP | 2015-005218 | * | 1/2015 |
| JP | 2015005218 A | | 1/2015 |

* cited by examiner

*Primary Examiner* — Lennin R Rodriguezgonzalez
(74) *Attorney, Agent, or Firm* — Canon U.S.A., Inc. IP Division

(57) ABSTRACT

An information processing system includes a management server and a multi-function peripheral (MFP). The management server specifies an environment of a network to which the MFP is connected, selects a security policy associated with the specified environment of the network, and delivers the security policy to the MFP. The MFP receives the security policy associated with the environment of the connected network from the management server, and applies the security policy.

12 Claims, 10 Drawing Sheets

FIG.5

| TLS | | SMB | |
|---|---|---|---|
| SETTING VALUE | RANGE | SETTING VALUE | RANGE |
| 1.3 | 1.2 – 1.3 | 3.0 | 2.0 – 3.0 |

501

| SECURITY POLICY | TLS | | SMB | |
|---|---|---|---|---|
| | SETTING VALUE | RANGE | SETTING VALUE | RANGE |
| INTRA | 1.3 | 1.2 – 1.3 | 3.0 | 2.0 – 3.0 |
| SOHO | 1.3 | 1.2 – 1.3 | 3.0 | 3.0 |
| PUBLIC | 1.3 | 1.3 | OFF | OFF |

| DEVICE NAME | ADDRESS | NETWORK ENVIRONMENT IDENTIFIER |
|---|---|---|
| MFP 100 | xxx.xxx.xxx.xxx | INTRA |
| MFP 110 | yyy.yyy.yyy.yyy | PUBLIC |

601

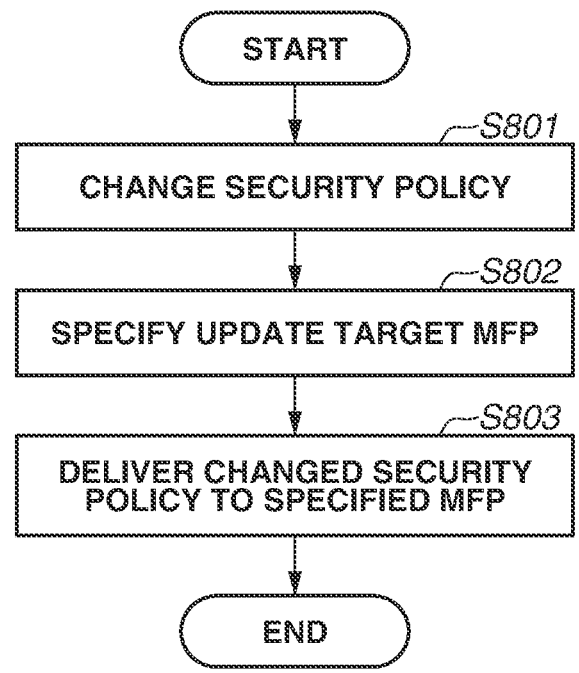

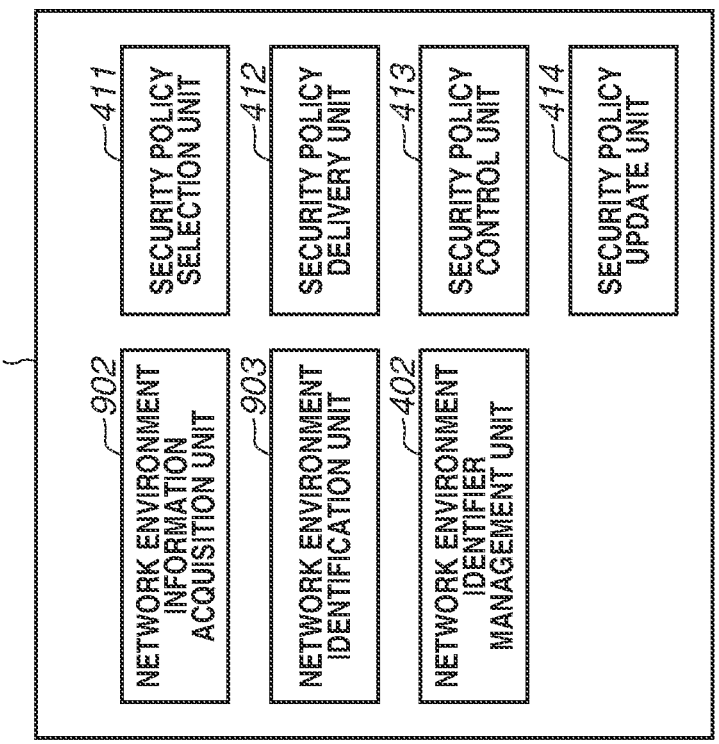
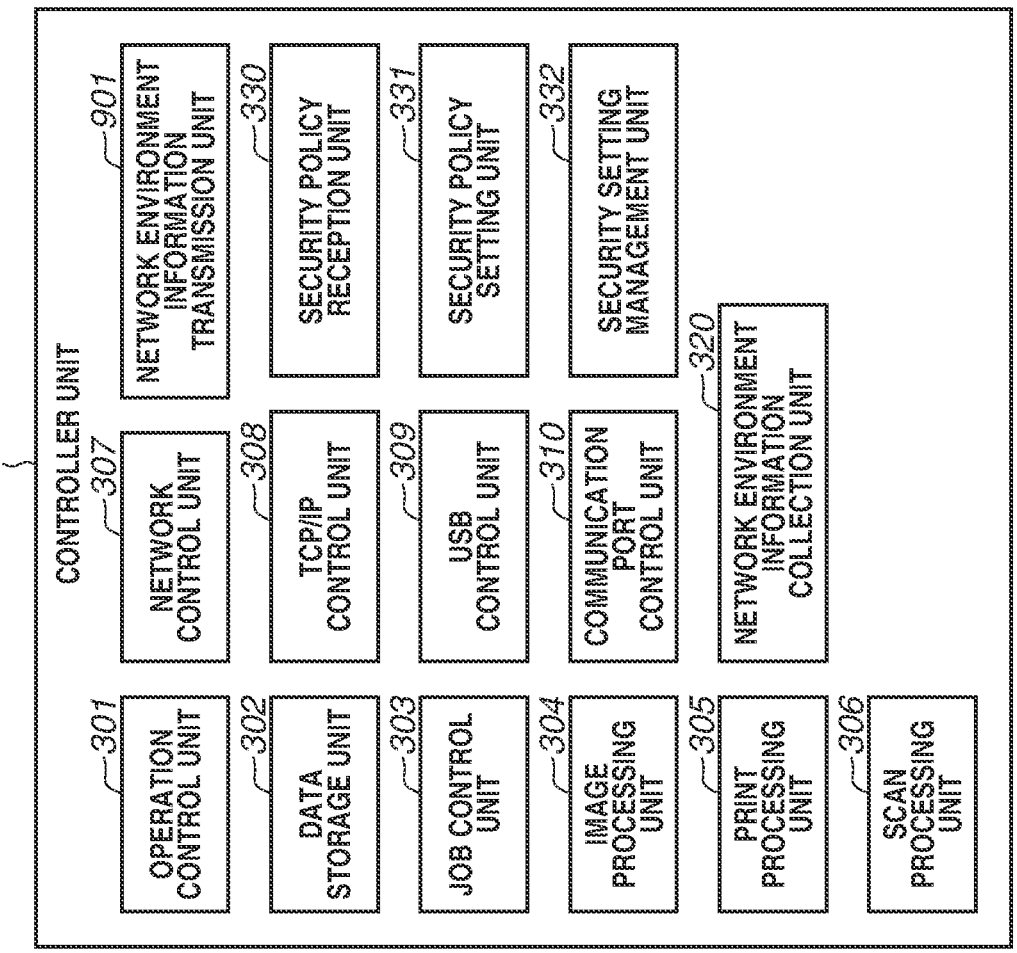
FIG.9

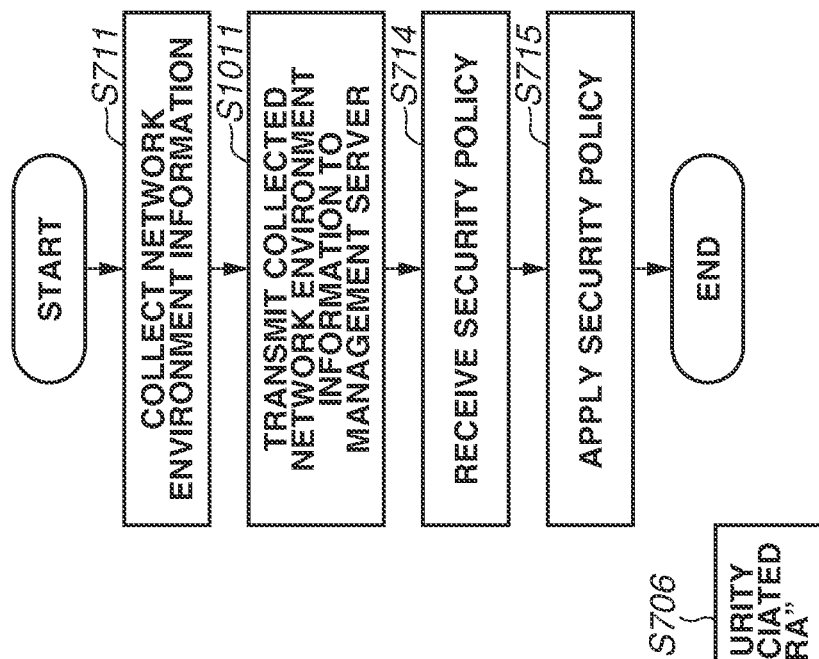
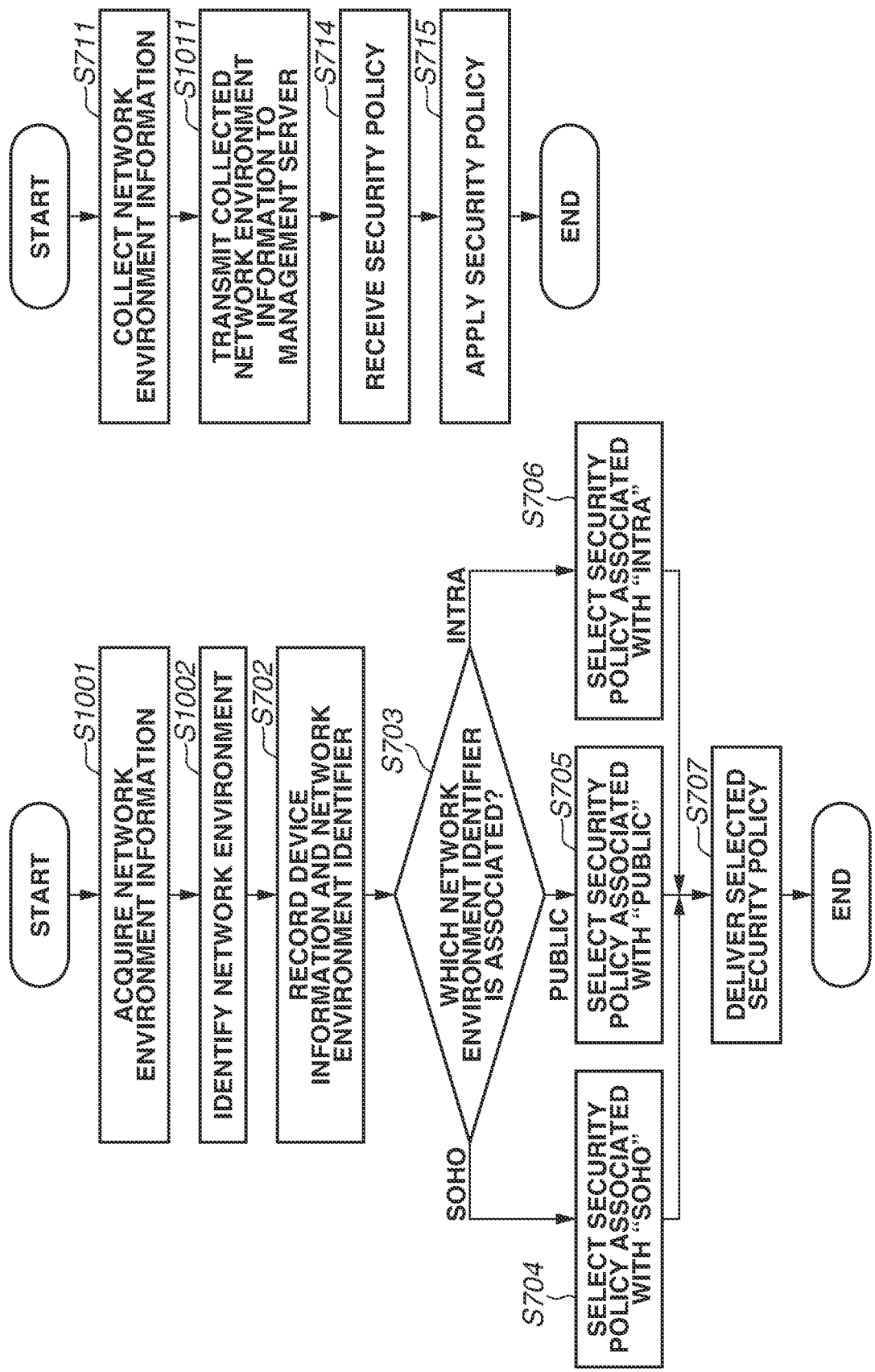

INFORMATION PROCESSING SYSTEM, INFORMATION PROCESSING APPARATUS, AND CONTROL METHOD FOR SETTING A SECURITY POLICY TO BE MANAGED DEPENDING ON CIRCUMSTANCES AT DIFFERENT TIMES

BACKGROUND OF THE DISCLOSURE

Field of the Disclosure

The present disclosure relates to an information processing system, an information processing apparatus, and a control method for the information processing system.

Description of the Related Art

Heretofore, information processing apparatuses installed in a company have been operated within a network managed by the company and thus have been protected against attacks from outside the company at the boundary of the network. With the recent diversification of office environments due to the application of teleworking, the use of a satellite office or a rental office, and the like, the environment in which information processing apparatuses are installed has varied. With the diversification of office environments as described above, a situation can occur where a difference in installation environment occurs among information processing apparatuses under management of an organization, and setting information about security of each information processing apparatus is to be individually adjusted so as to protect each information processing apparatus against security threats.

Various techniques for managing setting information about the security of a target information processing apparatus using a security policy including security rules have recently been studied. Japanese Patent Application Laid-Open No. 2015-005218 discusses a management apparatus configured to change a security policy for an information processing apparatus to be managed depending on a management life cycle or a management status.

With the diversification of office environments, a situation in which an environment of a network to which an information processing apparatus to be managed is connected is changed can also occur. If the environment of the network to which the target information processing apparatus is connected is changed, the security policy applied to the information processing apparatus can be unsuitable for the changed environment of the network.

The present disclosure is directed to providing a technique for applying a security policy to an information processing apparatus to be managed in a suitable mode depending on circumstances at different times.

SUMMARY OF THE DISCLOSURE

According to an aspect of the present disclosure, an information processing system includes a first information processing apparatus, and at least one second information processing apparatus, wherein the first information processing apparatus includes a specifying unit configured to specify an environment of a network to which the second information processing apparatus is connected, a selection unit configured to select a security policy associated with the environment of the network specified by the specifying unit, and a delivery unit configured to deliver the security policy selected by the selection unit to the second information processing apparatus, and wherein the second information processing apparatus includes a reception unit configured to receive the security policy associated with the environment of the connected network from the first information processing apparatus, and an application unit configured to apply the security policy received by the reception unit.

Further features of the present disclosure will become apparent from the following description of exemplary embodiments with reference to the attached drawings.

BRIEF DESCRIPTION OF THE DRAWINGS

FIG. 5 illustrates examples of security policies.

FIG. 6 illustrates an example of an MFP-network environment correspondence table.

FIG. 8 is a flowchart illustrating an example of processing performed by the management server.

FIG. 9 is a block diagram illustrating an example of a functional configuration of each of the MFP and the management server.

FIGS. 10A and 10B are flowcharts each illustrating an example of processing performed by the information processing system.

DESCRIPTION OF THE EMBODIMENTS

Figure 1:
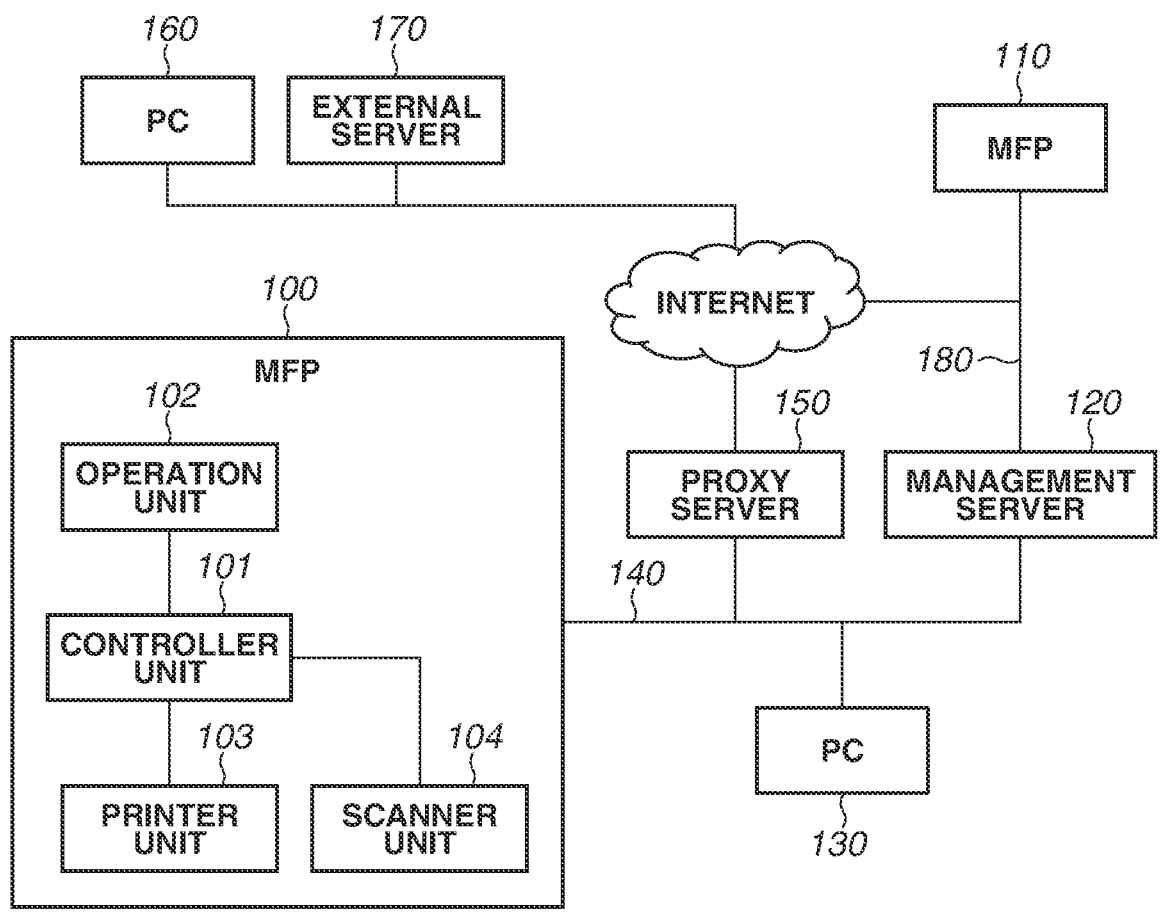
FIG. 1 is a block diagram illustrating an example of an outline of a system configuration of an information processing system according to a first exemplary embodiment.

Exemplary embodiments of the present disclosure will be described in detail below with reference to the accompanying drawings.

In the specification and the drawings, components having substantially the same functional configuration are denoted by the same reference numerals, and redundant descriptions thereof are omitted.

An example of a method for protecting an information processing apparatus to be managed against security threats is a method of applying a security policy suitable for an environment of a network to which the information processing apparatus is connected to the information processing apparatus.

As a specific example, under a circumstance in which a target information processing apparatus is connected to a network with effective network perimeter defense such as a firewall, it is difficult for a third party to access the information processing apparatus from outside. Accordingly, in this case, a risk may be acceptable, for example, even when a communication protocol in which information encryption is not applied is used in favor of connectivity.

On the other hand, a network that can be freely accessed by many and unspecified users, for example, in a public space, has a high risk of eavesdropping or the like. Accordingly, if the target information processing apparatus is connected to such a network, it may be undesirable to use the communication protocol in which the information encryption is not applied.

In particular, with the diversification of office environments in recent years, a situation in which an environment of a network to which an information processing apparatus to be managed is connected is changed can occur. As a specific example, if an Internet Protocol (IP) address applied to the target information processing apparatus is changed from a private address to a global address, the information processing apparatus is directly connected to the Internet, which leads to an increase in the risk of unauthorized access or the like. Accordingly, under such circumstances, it may be desirable to update the security policy applied to the target information processing apparatus with a security policy for setting the security strength to a higher level to better prioritize the protection against security threats.

In view of the above circumstances, an exemplary embodiment of the present disclosure describes an example of a mechanism in which a security policy suitable for an environment of a network to which an information processing apparatus to be managed is connected is selected and the selected security policy is applied to the information processing apparatus. The exemplary embodiment of the present disclosure describes an example where a multi-function peripheral (MFP) that is an image forming apparatus that forms an image on a recording medium such as paper is applied as the information processing apparatus to which the security policy is applied, for convenience of description. However, the above-described information processing apparatus is not limited to an MFP. An information processing apparatus other than an MFP, such as a personal computer (PC) and a server, can also be applied as the information processing apparatus.

An example of an information processing system according to a first exemplary embodiment of the present disclosure will be described.

First, with reference to FIG. 1, an example of an outline of a system configuration of the information processing system according to the first exemplary embodiment will be described.

In the information processing system according to the present exemplary embodiment, an MFP 100, a PC 130, and a management server 120 are connected via a local area network (LAN) 140.

The management server 120 manages the MFP 100 and an MFP 110, and acquires, from each of the MFP 100 and the MFP 110, information about environments of networks to which the MFP 100 and the MFP 110 are respectively connected. Then, the management server 120 delivers security policies to the MFP 100 and the MFP 110, respectively, and updates the security policies.

The PC 130 executes processing, such as transmission and reception of a print job for printing an image on a recording medium and a scan job for scanning a printed material, on the MFP 100.

The MFP 100 is connected to the Internet via a proxy server 150, and communicates with external apparatuses, such as a PC 160 and an external server 170, via the proxy server 150 and the Internet.

The MFP 110 is directly connected to the Internet, and communicates with the external apparatuses, such as the PC 160 and the external server 170, via the Internet.

The MFP 100 includes a controller unit 101, an operation unit 102, a printer unit 103, and a scanner unit 104.

The operation unit 102 receives an instruction from a user, and presents information to the user.

The printer unit 103 executes processing for forming an image on a recording medium such as paper (in other words, print processing) based on input electronic data.

The scanner unit 104 optically scans a printed material or the like, and converts a scanning result into an image signal to thereby generate image data. Thus, the scanning result of the printed material is converted into electronic data.

The controller unit 101 controls operation of each of the components, such as the operation unit 102, the printer unit 103, and the scanner unit 104, in the MFP 100. The controller unit 101 controls the operation of each of the components of the MFP 100, thereby implementing various functions provided by the MFP 100.

The PC 130 serves as a terminal apparatus for the user to use the MFP 100 and the like. As a specific example, the PC 130 transmits and receives a print job and a scan job to and from the MFP 100 in response to an instruction from the user.

In the example illustrated in FIG. 1, the management server 120 is an example of a "first information processing apparatus", and the MFP 100 is an example of a "second information processing apparatus".

(Hardware Configuration)

Figure 2:
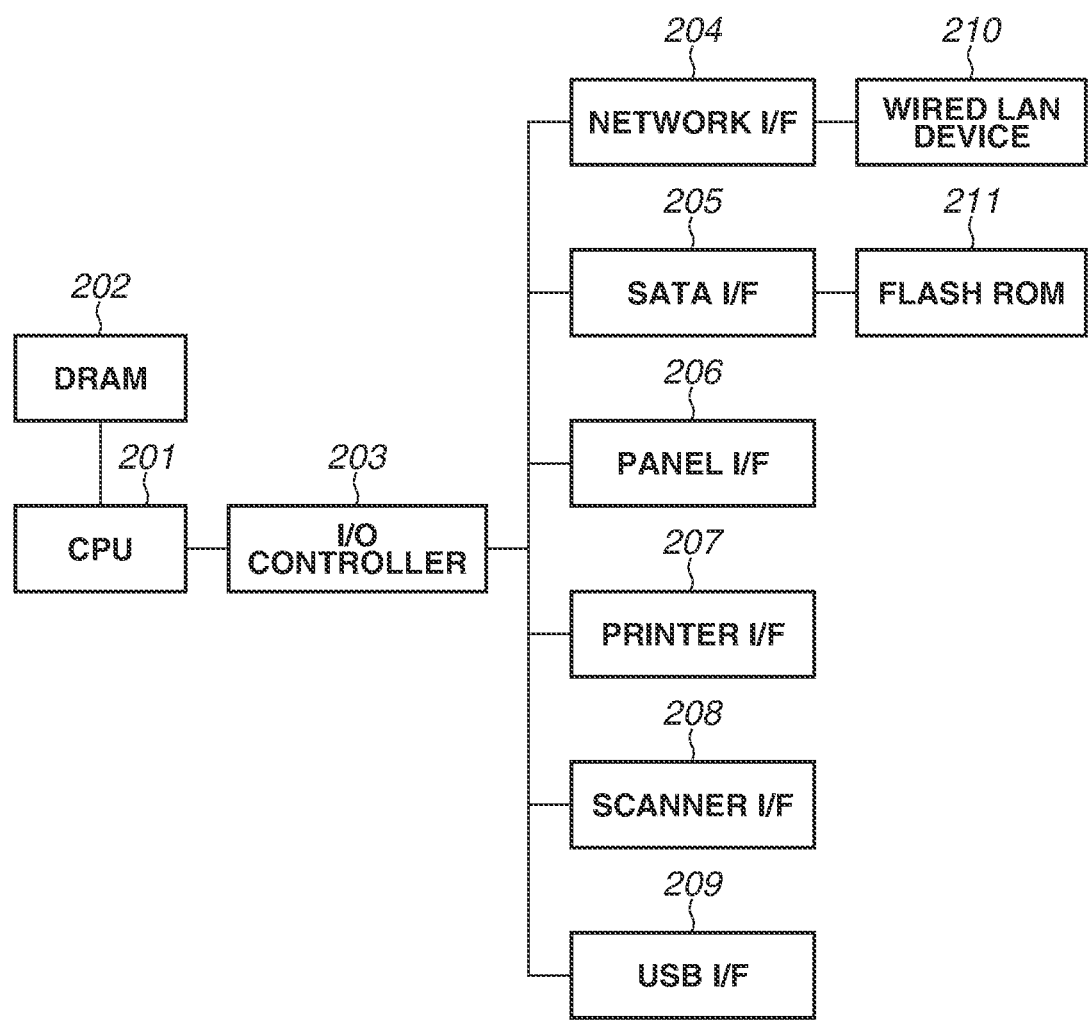
FIG. 2 is a block diagram illustrating an example of a hardware configuration of a multi-function peripheral (MFP).

An example of a hardware configuration of the MFP 100 will be described with reference to FIG. 2, in particular, with a focus on the configuration of the controller unit 101. The controller unit 101 includes a central processing unit (CPU) 201, a dynamic random access memory (DRAM) 202, and an input/output (I/O) controller 203. The controller unit 101 also includes a network interface (I/F) 204, a serial advanced technology attachment (SATA) OF 205, and a panel OF 206. The controller unit 101 also includes a printer OF 207, a scanner I/F 208, and a universal serial bus (USB) OF 209.

The CPU 201 controls operations of various components in the controller unit 101, and executes various arithmetic processing for implementing functions provided by the controller unit 101.

The CPU 201 and the DRAM 202 are interconnected so that the CPU 201 and the DRAM 202 can exchange data via a bus. In the process in which the CPU 201 executes arithmetic processing, the DRAM 202 is used by the CPU 201 as a storage area for temporarily holding program data indicating operation instructions, data to be processed, and the like.

The CPU 201 and the I/O controller 203 are interconnected so that the CPU 201 and the I/O controller 203 can exchange data via a bus. The I/O controller 203 inputs and outputs information to and from various devices according to an instruction from the CPU 201.

The I/O controller 203 is connected to a storage device illustrated as a flash read-only memory (ROM) 211 via the SATA OF 205. The flash ROM 211 is used as a storage area for holding various data such as programs for the CPU 201 to implement various functions of the MFP 100, and document files.

The I/O controller 203 is connected to a communication device illustrated as a wired LAN device 210 via the network I/F 204. The CPU 201 controls the wired LAN device 210 via the network I/F 204 to thereby establish communication with another apparatus via the LAN 140. The type of communication device connected to the network I/F 204 may be appropriately changed depending on the type of network used for communication with another apparatus and a communication method to be applied. As a specific example, in the case of using what is called a wireless LAN, a wireless LAN device used to access the wireless LAN may be connected to the network I/F 204.

The I/O controller 203 is connected to the panel I/F 206. The CPU 201 controls the operation of the operation unit 102 via the panel I/F 206, thereby making it possible to receive an instruction from the user via the operation unit 102 and to present information to the user via the operation unit 102.

The I/O controller 203 is connected to the printer I/F 207. The CPU 201 controls the operation of the printer unit 103 via the printer I/F 207, thereby making it possible to form an image on a recording medium such as paper.

The I/O controller 203 is connected to the scanner I/F 208. The CPU 201 controls the operation of the scanner unit 104 via the scanner I/F 208, thereby making it possible to scan a document such as a printed material.

The I/O controller 203 is connected to the USB I/F 209. The CPU 201 controls the operation of a device connected to the USB I/F 209 via the USB I/F 209.

Specific examples of operations for implementing various functions will now be described.

In the case of implementing a copying function, the CPU 201 reads a program in the flash ROM 211 via the SATA I/F 205 and loads the program into the DRAM 202. After that, the CPU 201 receives an instruction for copying from the user on the operation unit 102 via the panel I/F 206 based on the program loaded into the DRAM 202.

Upon receiving the instruction for copying, the CPU 201 controls the scanner unit 104 via the scanner OF 208, acquires image data corresponding to a document scanning result from the scanner unit 104, and holds the image data in the DRAM 202.

The CPU 201 performs image processing, such as color conversion processing suitable for output, on the image data held in the DRAM 202. After that, the CPU 201 transfers the image data held in the DRAM 202 to the printer unit 103 via the printer OF 207, and issues a print instruction to the printer unit 103. Thus, the printer unit 103 executes print processing based on the image data transferred from the CPU 201, thereby forming an image indicated by the image data on a recording medium such as paper.

As another example, in the case of page description language (PDL) printing, for example, the PC 130 issues a print instruction to the MFP 100 via the LAN 140. The CPU 201 reads a program in the flash ROM 211 via the SATA OF 205 and loads the program into the DRAM 202.

The CPU 201 detects the print instruction transmitted from the PC 130 via the network I/F 204 based on the program loaded into the DRAM 202. Upon detecting a PDL transmission instruction as the above-described print instruction, the CPU 201 receives print data from the PC 130 via the network I/F 204, and stores the print data in the flash ROM 211 via the SATA OF 205. Upon completion of storage of the print data in the flash ROM 211, the CPU 201 loads the print data stored in the flash ROM 211 into the DRAM 202 as image data.

The CPU 201 performs image processing, such as color conversion processing suitable for output, on the image data loaded into the DRAM 202. After that, the CPU 201 transfers the image data held in the DRAM 202 to the printer unit 103 via the printer OF 207, and issues a print instruction to the printer unit 103. Thus, the printer unit 103 executes print processing based on the image data transferred from the CPU 201, thereby forming an image indicated by the image data on a recording medium such as paper.

(Functional Configuration)

Figure 3:
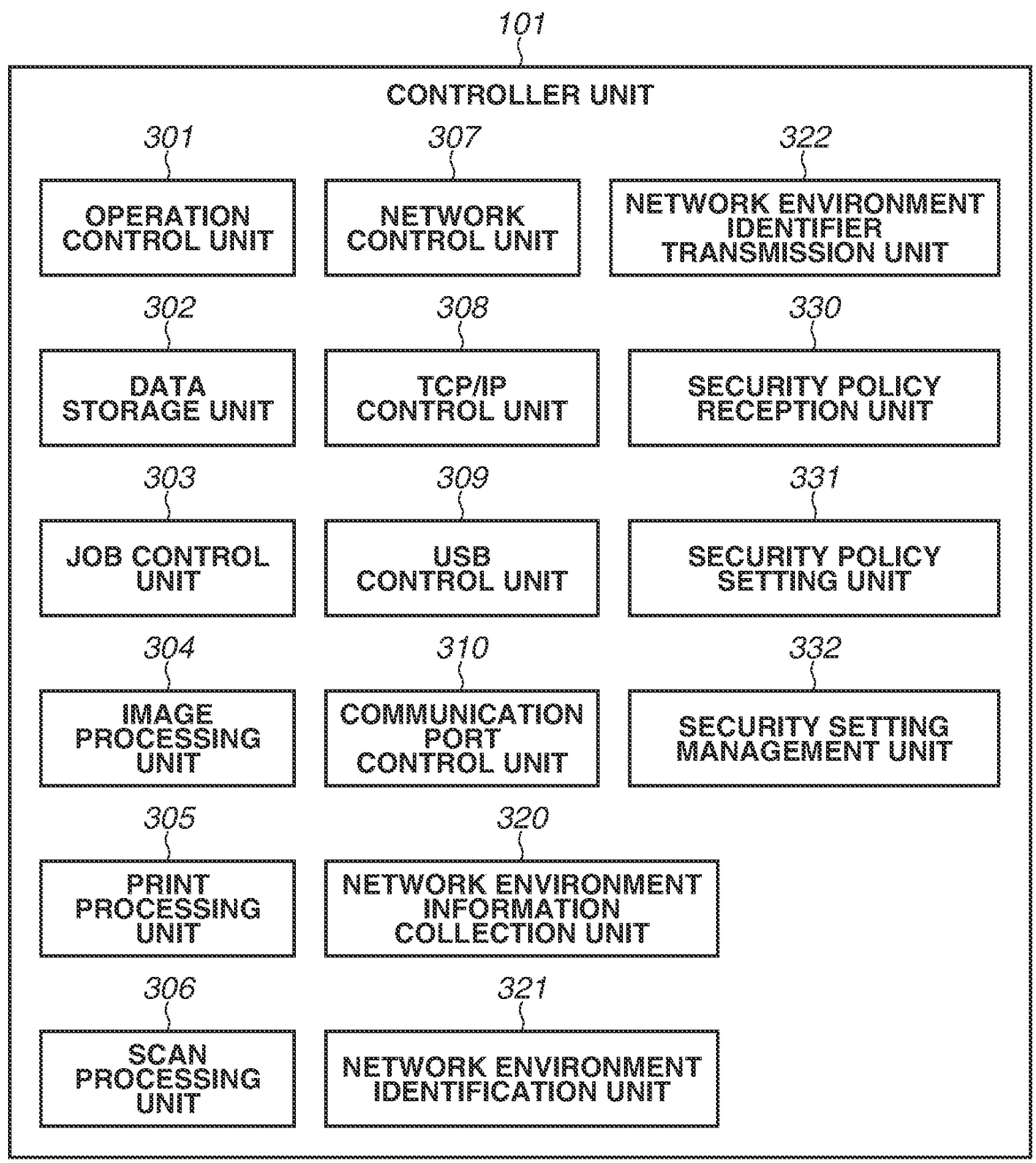
FIG. 3 is a block diagram illustrating an example of a functional configuration of the MFP.

An example of a functional configuration of the MFP 100 according to the present exemplary embodiment will be described with reference to FIG. 3, in particular, with a focus on the configuration of the controller unit 101. The controller unit 101 includes an operation control unit 301, a data storage unit 302, a job control unit 303, an image processing unit 304, a print processing unit 305, and a scan processing unit 306. The controller unit 101 also includes a network control unit 307, a Transmission Control Protocol (TCP)/IP control unit 308, a USB control unit 309, and a communication port control unit 310. The controller unit 101 also includes a network environment information collection unit 320, a network environment identification unit 321, a network environment identifier transmission unit 322, a security policy reception unit 330, a security policy setting unit 331, and a security setting management unit 332.

The operation control unit 301 presents information to the user via a screen by displaying the screen on the operation unit 102. The operation control unit 301 receives an instruction from the user by detecting a user operation on the operation unit 102. As a specific example, the operation control unit 301 may execute processing associated with a screen component, such as a button displayed on the screen, by detecting the user operation on the screen component.

The data storage unit 302 stores data in the flash ROM 211 and reads data stored in the flash ROM 211 in response to a request from another control unit. As a specific example, if the operation unit 102 has received an instruction for changing a device setting from the user, the operation control unit 301 recognizes the contents input by the user. After that, the operation control unit 301 instructs the data storage unit 302 to hold setting values based on a result of recognizing the contents input by the user. Upon receiving the instruction, the data storage unit 302 stores the setting values in the flash ROM 211.

The job control unit 303 controls execution of various jobs according to an instruction from another control unit.

The image processing unit 304 performs various types of image processing on target image data according to an instruction from the job control unit 303. As a specific example, the image processing unit 304 processes target image data into data in a format suitable for each intended use according to the instruction from the job control unit 303.

The print processing unit 305 controls the printer unit 103 via the printer OF 207 according to an instruction from the job control unit 303, and executes processing for forming an image on a recording medium such as paper (print processing).

The scan processing unit 306 controls the scanner unit 104 via the scanner OF 208 according to an instruction from the job control unit 303, and executes processing for scanning of a placed document.

For example, at system start-up, or when a setting change instruction is received, the network control unit 307 performs settings for communication via a network, such as an IP address, on the TCP/IP control unit 308 based on the setting values held in the data storage unit 302.

The TCP/IP control unit 308 executes processing for transmitting and receiving network packets to and from an external apparatus via the network I/F 204 according to an instruction from another control unit.

The USB control unit 309 controls each apparatus connected via the USB OF 209.

The communication port control unit 310 controls a port used by the TCP/IP control unit 308 to transmit and receive packets.

At a given opportunity, for example, at the start of an operation, the network environment information collection unit 320 collects various types of setting information about the MFP 100 held in the data storage unit 302 and information obtained from a network device present on the network to which the MFP 100 is connected.

Examples of the setting information about the MFP 100 include an IP address, the type (global address, private address) of the IP address, information indicating whether to use the proxy server 150 in communication with an external apparatus, and a protocol used for communication. These pieces of setting information are merely examples. Among the pieces of setting information held in the data storage unit 302 of the MFP 100, in particular, information about the environment of the network to which the MFP 100 is connected can be collected by the network environment information collection unit 320.

Examples of information obtained from a network device may include an IP address of a transmission source that has transmitted packets received by the MFP 100, the type (global address, private address) of the IP address, and information about a port used for communication. Other examples of the information may include information about Time to Live (TTL) of packets, and a response to an address resolution protocol (ARP) transmitted by the MFP 100. Other examples of the information may also include a response from a domain name system (DNS) server, and information about a dynamic host configuration protocol (DHCP) server.

Not only the pieces of information described above as examples but also any information that can be collected by the MFP 100 can be included in the information to be collected by the network environment information collection unit 320. Hereinafter, the information to be collected by the network environment information collection unit 320, such as the setting information about the MFP 100 and the information obtained from a network device as described above, is referred to as network environment information. The network environment information collected by the network environment information collection unit 320 is stored in the data storage unit 302.

While the above-described exemplary embodiment describes an example where the network environment information collection unit 320 starts processing at the start of an operation, the opportunity at which the network environment information collection unit 320 starts processing is not particularly limited thereto. As a specific example, upon receiving an instruction from the user through the operation control unit 301, the network environment information collection unit 320 may start processing. As another example, the network environment information collection unit 320 may start processing in response to an instruction from another apparatus such as the management server 120.

The network environment identification unit 321 identifies the environment of the network to which the MFP 100 is connected based on the network environment information collected by the network environment information collection unit 320. As a specific example, network environment candidates may be defined in advance, and the network environment identification unit 321 may classify the environment of the network to which the MFP 100 is connected as any one of the network environment candidates. Examples of the candidates include "small office/home office (SOHO)", "public", and "intra". These candidates are merely examples, and other candidates into which the environment of the network is classified may be defined. Hereinafter, identification information indicating the identification result in terms of security (in other words, identification result based on conditions for security) of the environment of the network to which the MFP 100 is connected as described above is referred to as a network environment identifier.

An example of a network environment identification method will now be described.

For example, if the use of the proxy server 150 is confirmed based on the setting information about the MFP 100, or if communication from the proxy server 150 is detected, network perimeter defense is applied by the proxy server 150. Accordingly, in such a case, the network environment identification unit 321 may identify the environment of the network to be an intra environment corresponding to an environment of the network with relatively high security, and may set an identifier indicating the intra environment as the network environment identifier.

As another example, a case in which an operation is performed in a private network while the network perimeter defense as in the intra environment is not applied can be assumed.

In such a case, the network environment identification unit 321 may identify the environment of the network to be a SOHO environment, and may set an identifier indicating the SOHO environment as the network environment identifier.

As yet another example, a case in which an operation is performed in an environment that can be accessed by many and unspecified users, as in a case where a global address is set as the IP address, or in a case where direct communication is performed with an external server or a client, can be assumed. In such a case, the network environment identification unit 321 may identify the environment of the network to be a public environment corresponding to an environment of the network with relatively low security, and may set an identifier indicating the public environment as the network environment identifier.

In the example illustrated in FIG. 1, the MFP 100 is connected to an external apparatus via the proxy server 150. Accordingly, the network environment identification unit 321 determines that the environment of the network to which the MFP 100 is connected is the intra environment.

While the above-described exemplary embodiment describes an example of the method of identifying the environment of the network based on whether a specific condition is satisfied (i.e., a rule-based identification method), the method of identifying the environment of the network is not particularly limited. As a specific example, the environment of the network may be identified by an artificial intelligence (AI) created by machine learning. In this case, for example, the AI may be caused to learn the relationship between the network environment information and the network environment identifier. Then, collected network environment information may be input to the AI, and the AI outputs a network environment identification result.

The network environment identifier transmission unit 322 associates the network environment identifier corresponding to the network environment identification result obtained by the network environment identification unit 321 with device information about the MFP 100, and transmits the associated network environment identifier and device information to the management server 120. As the device information, information that can be used to identify the MFP 100, such as a device name, an IP address, or a media access control (MAC) address of the MFP 100, can be applied.

The security policy reception unit 330 receives a security policy 501 delivered from the management server 120. The security policy 501 is a security policy to be applied to the MFP 100 and includes information such as a recommended value for setting information about the security of the MFP 100, and a range of values with which the setting information can be customized (e.g., a range of setting values that can be designated by the user).

An example of the above-described security policy 501 will now be described with reference to FIG. 5.

In the example illustrated in FIG. 5, the security policy 501 includes setting information about Transport Layer Security (TLS) and Server Message Block (SMB).

TLS setting information indicates "1.3" as a setting value (recommended value) and also indicates a range of "1.2 to 1.3". In this case, in the TLS setting information, "1.3" is applied as a default value, and the setting value can be changed within the range of "1.2 to 1.3" in response to an instruction or the like from the user.

Similarly, SMB setting information indicates "3.0" as a setting value (recommended value) and also indicates a range of "2.0 to 3.0".

While FIG. 5 illustrates an example where the security policy 501 includes TLS setting information and SMB setting information, information included in the security policy 501 is not particularly limited. In other words, the setting information is not limited to TLS setting information and SMB setting information, and other setting information about the security of the MFP 100 can be applied. The setting information may include information indicating a policy for settings of conditions for the other setting information (e.g., setting values (recommended values) and a range of the values).

The description continues with reference to FIG. 3 again.

The security policy setting unit 331 applies the security policy 501, which is received by the security policy reception unit 330, to the setting information about the security of the MFP 100. As a specific example, the security policy setting unit 331 may apply values specified as setting values (recommended values) for a series of pieces of setting information in the security policy 501 as setting values for the corresponding setting information in the MFP 100.

The security setting management unit 332 monitors the setting values for the setting information about security to check if the setting values satisfy the security policy.

As a specific example, under a circumstance in which the security policy 501 illustrated in FIG. 5 is applied, when the setting value in the TLS setting information is changed to "1.0", the changed setting value falls outside of the range specified in the security policy 501. The security setting management unit 332 detects that the setting value falls outside of the range, and limits a change in the corresponding setting information (e.g., a change to a newly designated setting value). As a specific example, the security setting management unit 332 may prevent the corresponding setting information from being changed in such a case. As another example, the security setting management unit 332 may allow a conditional change instead of prevention of any change, such as in the case of allowing a change of the corresponding setting information when a predetermined condition, such as authorization by an administrator, is satisfied.

Upon detecting that the change in the setting information is against the security policy, the security setting management unit 332 may provide the user with notification information (e.g., information indicating a warning) indicating that the change in the setting information is against the security policy via a predetermined output unit.

As another example, the security setting management unit 332 may limit an update of the setting information against the security policy. As a specific example, the security setting management unit 332 may perform control processing by limiting a setting value that can be designated by the user within a range specified in the security policy to thereby prevent the user from designating a setting value against the security policy. As yet another example, the security setting management unit 332 may perform control processing to prevent the user from selecting an option corresponding to a setting value against the security policy from among a series of options for the setting value applied to the setting information about security.

Figure 4:
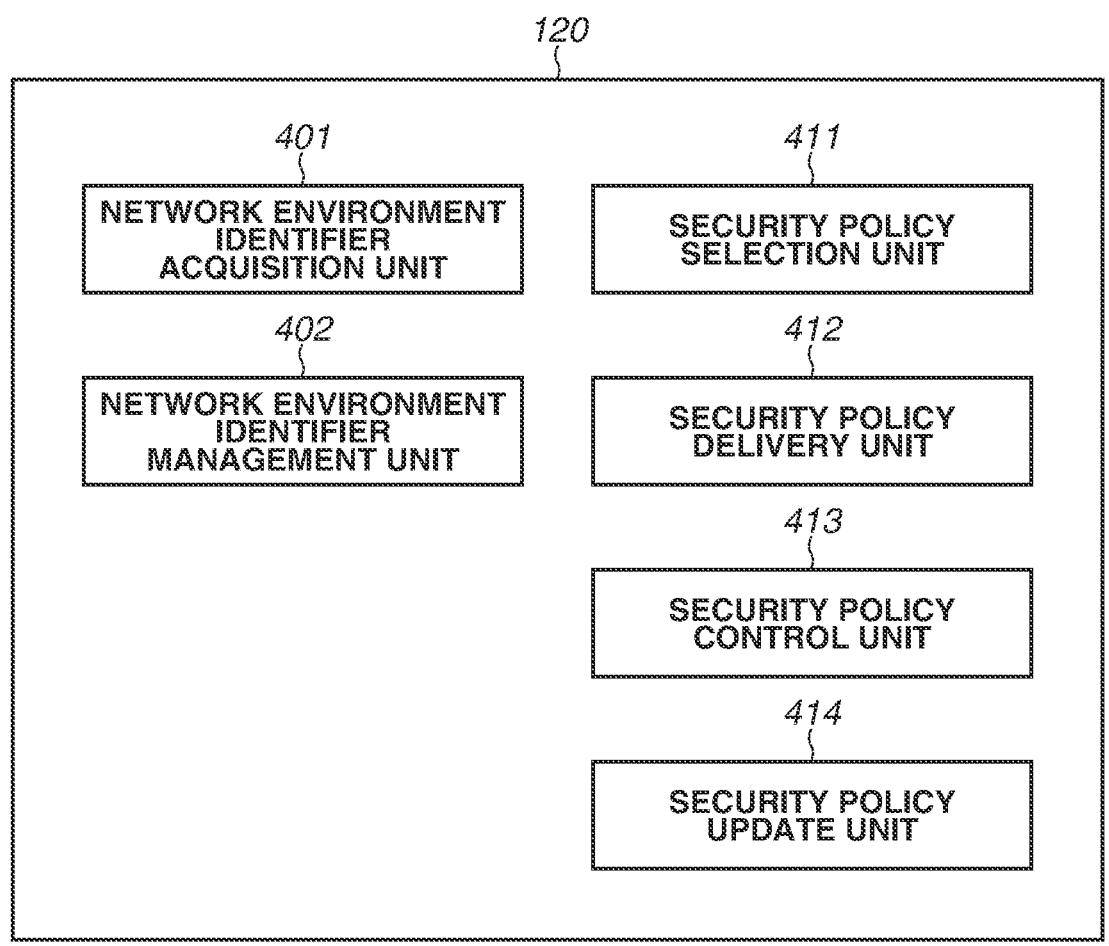
FIG. 4 is a block diagram illustrating an example of a functional configuration of a management server.

Next, an example of a functional configuration of the management server 120 according to the present exemplary embodiment will be described with reference to FIG. 4. The management server 120 includes a network environment identifier acquisition unit 401 and a network environment identifier management unit 402. The management server 120 also includes a security policy selection unit 411, a security policy delivery unit 412, a security policy control unit 413, and a security policy update unit 414.

The network environment identifier acquisition unit 401 acquires, from the MFP 100 and the MFP 110 under the management of the management server 120, the device information about each of the MFP 100 and the MFP 110 and the network environment identifiers indicating the environments of the networks to which the MFP 100 and the MFP 110 are respectively connected.

The network environment identifier management unit 402 manages information (e.g., network environment identifiers) indicating the environments of the networks to which the MFP 100 and the MFP 110 are respectively connected by recording the information on an MFP-network environment correspondence table for each of the MFP 100 and the MFP 110 under the management of the management server 120.

An example of the MFP-network environment correspondence table used by the network environment identifier management unit 402 to manage information indicating the environments of the networks to which the MFP 100 and the MFP 110 are respectively connected for each of the MFP 100 and the MFP 110 under the management of the management server 120 will now be described with reference to FIG. 6.

Device information about the MFP 100 and device information about the MFP 110 acquired from the MFP 100 and the MFP 110, respectively, by the network environment identifier acquisition unit 401, and information indicating the environments of the networks to which the MFP 100 and the MFP 110 are respectively connected are recorded on an MFP-network environment correspondence table 601. In the example illustrated in FIG. 6, device names of the MFP 100 and the MFP 110 and IP addresses allocated to the MFP 100 and the MFP 110, respectively, are recorded on the MFP-network environment correspondence table 601 as device information about the MFP 100 and the MFP 110. The network environment identifiers are also recorded on the MFP-network environment correspondence table 601 as the information indicating the environments of the networks to which the MFP 100 and the MFP 110 are respectively connected.

As a specific example, in the setting information about the MFP 100, "MFP 100" is recorded as the device name, "xxx.xxx.xxx.xxx" is recorded as the IP address, and "intra" is recorded as the network environment identifier. As another example, in the setting information about the MFP 110, "MFP 110" is recorded as the device name, "yyy.yyy.yyy.yyy" is recorded as the IP address, and "public" is recorded as the network environment identifier.

The description continues with reference to FIG. 4 again.

The security policy selection unit 411 refers to the MFP-network environment correspondence table 601, and selects the security policy to be delivered to the target MFP based on information indicating the environment of the network to which the target MFP is connected. In this case, candidates for the security policy to be selected are managed in a security policy table 502.

An example of the security policy table 502 will now be described with reference to FIG. 5. Security policies specified assuming that the security policies are to be applied to the respective environments of the networks are recorded on the security policy table 502 for each piece of information indicating the environment of the network. For example, in the security policy table 502 illustrated in FIG. 5, the security policies are recorded for respective network environment identifiers.

For example, if the network environment identifier corresponding to the MFP 100 indicates "intra", the security policy selection unit 411 selects the security policy associated with the environment classified as "intra" from the security policy table 502.

The description continues with reference to FIG. 4 again.

The security policy delivery unit 412 delivers the security policy selected by the security policy selection unit 411 to the target MFP.

The security policy control unit 413 executes processing for changing the security policy table 502. For example, the security policy control unit 413 may change the security policy table 502 according to an instruction from the user.

As a specific example, a situation in which the user (e.g., administrator) changes the security policy to strengthen the security and improve the usability can occur. In this case, the setting value or the range recorded on the security policy table 502 may be corrected through the security policy control unit 413 to thereby change the security policy. For example, the security policy may be changed in such a manner that the setting value corresponding to TLS setting information for the security policy corresponding to the intra environment is changed from "1.3" to "1.2". As another example, the range corresponding to TLS setting information for the security policy corresponding to the intra environment is changed from "1.2 to 1.3" to "1.3".

The security policy update unit 414 delivers the security policy changed by the security policy control unit 413 to the MFP to which the security policy before change is delivered, thereby updating the security policy to be applied to the MFP. The MFP to which the security policy is delivered is specified based on, for example, the network environment identifier associated with the changed security policy.

As a specific example, assume that the security policy corresponding to the intra environment is changed based on an instruction from the user. The security policy update unit 414 detects a change in the security policy based on the instruction from the user, and specifies the MFP for which the security policy is to be updated by referring to the MFP-network environment correspondence table 601. In this case, since the security policy corresponding to the intra environment is changed, the MFP 100 associated with the intra environment in the MFP-network environment correspondence table 601 is specified as the target MFP for which the security policy is to be updated in the example illustrated in FIG. 6.

The security policy update unit 414 delivers the changed security policy to the target MFP via the security policy delivery unit 412, thereby updating the security policy to be applied to the MFP.

The security policy delivered to the MFP may be automatically applied by the MFP, or may be applied when the MFP receives an instruction from the user.

(Processing)

Figure 7B:
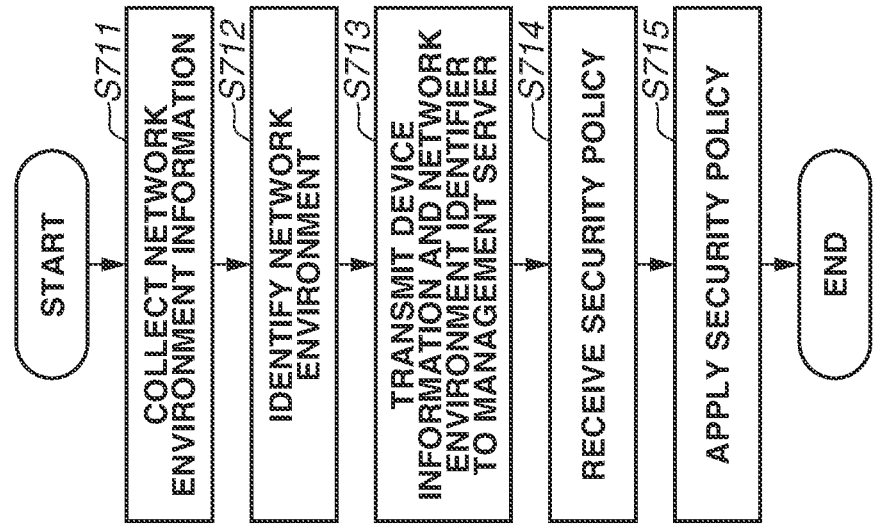
FIGS. 7A and 7B are flowcharts each illustrating an example of processing performed by the information processing system.
Figure 7A:
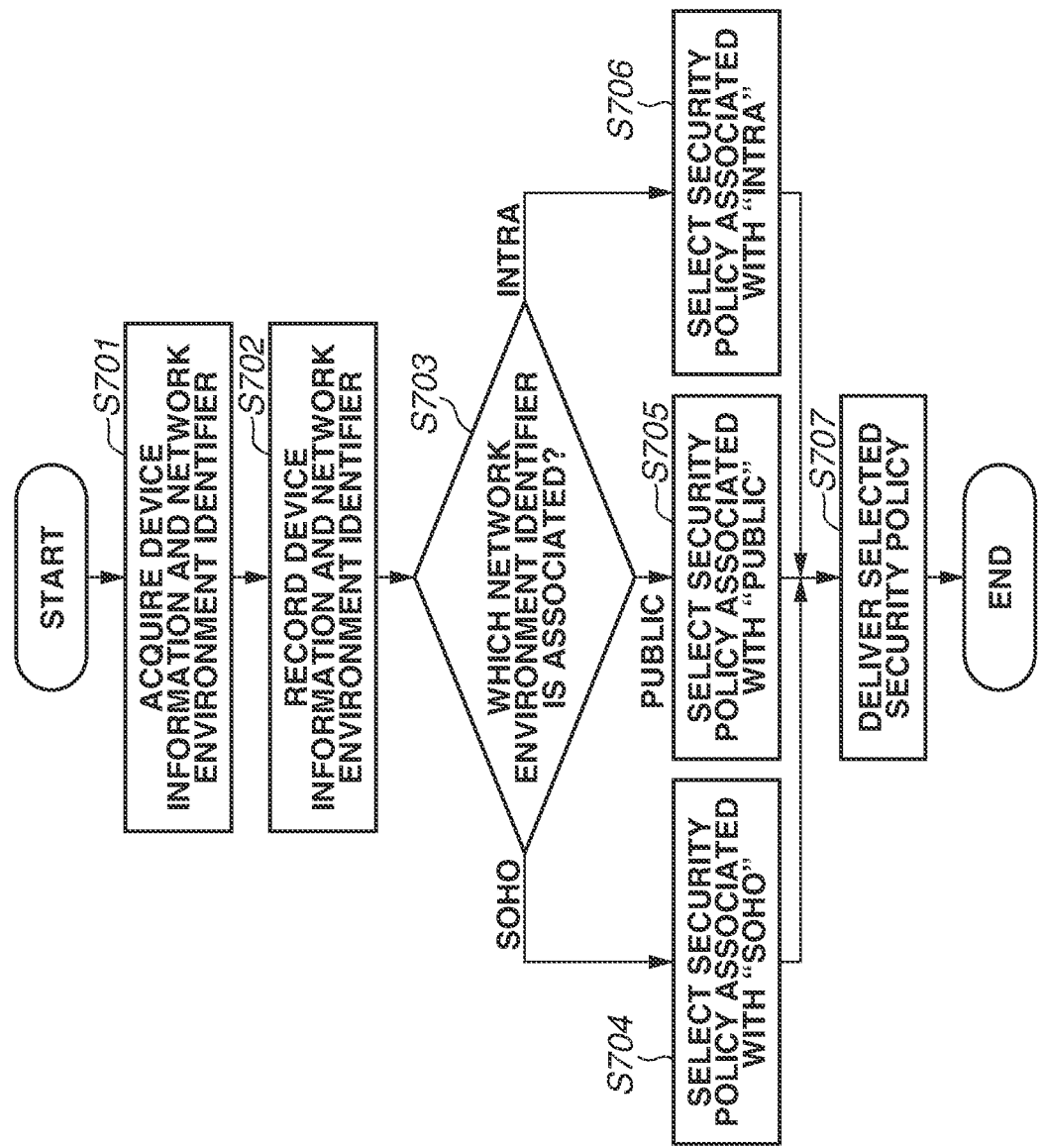

An example of processing performed by the information processing system according to the present exemplary embodiment will be described with reference to FIGS. 7A and 7B, in particular, with a focus on processing to be performed when the security policy suitable for the environment of the network to which the MFP 100 is connected is delivered. FIG. 7A is a flowchart illustrating an example of processing performed by the management server 120. FIG. 7B is a flowchart illustrating an example of processing performed by the MFP 100.

The example of processing performed by the management server 120 will be described with reference to FIG. 7A.

In step S701, the network environment identifier acquisition unit 401 acquires, from the MFP 100 to be managed, the device information about the MFP 100 and the network environment identifier corresponding to the environment of the network to which the MFP 100 is connected.

In step S702, the network environment identifier management unit 402 records the device information and network environment identifier corresponding to the MFP 100 acquired in step S701 on the MFP-network environment correspondence table 601.

In steps S703 to S706, the security policy selection unit 411 refers to the MFP-network environment correspondence table 601, and selects the security policy to be delivered to the MFP 100 from the security policy table 502.

Specifically, in step S703, the security policy selection unit 411 confirms the network environment identifier associated with the MFP 100 by referring to the MFP-network environment correspondence table 601, and changes subsequent processing depending on a confirmation result. In the example illustrated in FIG. 7A, any one of "SOHO", "public", and "intra" can be set as the network environment identifier.

If the security policy selection unit 411 confirms that the network environment identifier associated with the MFP 100 indicates "SOHO" in step S703, the processing proceeds to step S704. In step S704, the security policy selection unit 411 selects the security policy associated with "SOHO" from the security policy table 502.

If the security policy selection unit 411 confirms that the network environment identifier associated with the MFP 100 indicates "public" in step S703, the processing proceeds to step S705. In step S705, the security policy selection unit 411 selects the security policy associated with "public" from the security policy table 502.

If the security policy selection unit 411 confirms that the network environment identifier associated with the MFP 100 indicates "intra" in step S703, the processing proceeds to step S706. In step S706, the security policy selection unit 411 selects the security policy associated with "intra" from the security policy table 502.

In step S707, the security policy delivery unit 412 delivers the security policy selected in step S704, S705, or S706 to the MFP 100.

Next, an example of processing performed by the MFP 100 will be described with reference to FIG. 7B.

In step S711, the network environment information collection unit 320 collects the network environment information about the network to which the MFP 100 is connected at a given opportunity, for example, after the start of an operation of the MFP 100, or when an instruction is received from the user.

In step S712, the network environment identification unit 321 identifies the environment of the network to which the MFP 100 is connected based on the network environment information collected in step S711.

In step S713, the network environment identifier transmission unit 322 transmits the device information about the MFP 100 and the network environment identifier corresponding to the network environment identification result obtained in step S712 to the management server 120. After that, the MFP 100 waits for the delivery of the security policy from the management server 120.

When the security policy is delivered from the management server 120 to the MFP 100, in step S714, the security policy reception unit 330 receives the security policy.

In step S715, the security policy setting unit 331 applies the security policy received in step S714 to the MFP 100.

While the case has been described above where the MFP 100 waits for the delivery of the security policy after the device information and the network environment identifier are transmitted to the management server 120, the waiting processing may be executed on a background. In such a case, the MFP 100 may execute another processing while waiting for the delivery of the security policy from the management server 120 on a background.

As described above, in the information processing system according to the present exemplary embodiment, the security policy is delivered from the management server 120 to the MFP 100 depending on the identification result of the environment of the network to which the MFP 100 is connected. With this configuration, the security policy that is more suitable for the environment of the network to which the MFP 100 is connected can be applied to the MFP 100.

Modified Example 1

Modified Example 1 of the information processing system according to the present exemplary embodiment will be described. In the exemplary embodiment described above, the management server 120 delivers the security policy suitable for the environment of the network to which the MFP 100 is connected to the MFP 100. In Modified Example 1, in a case where the security policy managed by the management server 120 is changed according to an instruction from the user, the changed security policy is delivered to the MFP 100 to which the security policy before change has been previously delivered.

An example of processing performed by the management server 120 according to Modified Example 1 will be described with reference to FIG. 8, in particular, with a focus on processing to be performed when the security policy is changed. In the example illustrated in FIG. 8, assume that the security policy is changed according to an instruction from the user (e.g., administrator) for convenience of description.

Upon receiving an instruction for changing the security policy from the user, the security policy control unit 413 changes the designated security policy in the security policy table 502 according to the instruction in step S801.

In step S802, the security policy update unit 414 specifies the MFP associated with the network environment identifier corresponding to the security policy changed in step S801 by referring to the MFP-network environment correspondence table 601.

In step S803, the security policy delivery unit 412 delivers the security policy changed in step S801 to the MFP specified in step S802.

The above-described mechanism makes it possible to apply the changed security policy to the MFP to which the security policy before change is applied even when the security policy managed by the management server 120 is changed.

Modified Example 2

Modified Example 2 of the information processing system according to the present exemplary embodiment will be described. The exemplary embodiment described above describes an example where the management server 120 delivers the security policy that is more suitable for the environment of the network to which the MFP 100 is connected to the MFP 100 to which the security policy is not applied. Modified Example 2 describes an example where, when the environment of the network to which the MFP 100, to which the security policy has already been applied, is connected is changed, the management server 120 selects the security policy suitable for the changed environment of the network and delivers the selected security policy to the MFP 100.

As a specific example, assume that the operation of the MFP 100 connected to the Internet via the proxy server 150 is changed to an operation in which the MFP 100 is connected to the Internet without involving the proxy server 150 due to a change in setting information about security. In this case, the environment of the network to which the MFP 100 is connected is changed from the intra environment to the public environment. Accordingly, it may be desirable to change the security policy to be applied to the MFP 100 from the security policy for the intra environment to the security policy for the public environment.

An example of processing for updating the security policy when the environment of the network to which the MFP 100 is connected is changed will be described.

For example, when the setting information about the environment of the network is changed, or when the information obtained from peripheral network devices is changed, the identification result from the network environment identification unit 321 about the environment of the network to which the MFP 100 is connected changes. In this case, the network environment identifier transmission unit 322 transmits the network environment identifier corresponding to the identification result of the changed environment of the network to the management server 120.

The network environment identifier management unit 402 updates the MFP-network environment correspondence table 601 based on the network environment identifier acquired from the MFP 100 by the network environment identifier acquisition unit 401. If the environment of the network to which the MFP 100 is connected is changed, the security policy delivery unit 412 delivers the security policy associated with the changed environment of the network (in other words, the network environment identifier) to the MFP 100.

The security policy setting unit 331 updates the MFP-network environment correspondence table 601 based on the network environment identifier for the MFP 100 acquired by the network environment identifier acquisition unit 401. If the environment of the network to which the MFP 100 is connected is changed due to the updating of the MFP-network environment correspondence table 601, the security policy delivery unit 412 delivers the security policy that is more suitable for the changed environment of the network to the MFP 100.

If the security policy reception unit 330 receives the security policy corresponding to the changed environment of the network from the management server 120, the security policy setting unit 331 applies the security policy to the MFP 100.

The above-described configuration makes it possible to apply various settings for security suitable for the changed environment of the network to the MFP 100 even when the environment of the network to which the MFP 100 is connected is changed.

Modified Example 3

Modified Example 3 of the information processing system according to the present exemplary embodiment will be described. In Modified Example 3, the MFP 100 limits a change in the setting information about security according to an instruction from the user when the change in the setting information is against the security policy, and provides the user with notification information (e.g., information indicating a warning).

As a specific example, assume that the security policy 501 illustrated in FIG. 5 is applied to the MFP 100. In this case, if an instruction to change the setting value to "1.1" in the TLS setting information is received, the setting value falls outside of the range "1.2 to 1.3" specified for the TLS setting information in the security policy 501, and thus the setting value is against the security policy. In this case, the MFP 100 may prevent the TLS setting information from being changed based on the instruction received from the user, and may provide the user with information indicating a warning via the predetermined output unit.

An example of processing for limiting a change in the setting information against the security policy and providing notification information will now be described.

The instruction issued by the user to change the setting information about the security of the MFP 100 is received via, for example, the operation control unit 301. The security setting management unit 332 monitors a change in the setting information about the security of the MFP 100, and when the change is against the security policy, the security setting management unit 332 limits (for example, prevents) the change in the setting information. In this case, the security setting management unit 332 may provide the user with notification information indicating that the change in the setting information about security instructed by the user is against the security policy applied to the MFP 100.

As another example, the security setting management unit 332 may limit an update of the setting information against the security policy. As a specific example, the security setting management unit 332 may perform control processing by limiting a setting value that can be designated by the user within a range specified in the security policy to thereby prevent the user from designating a setting value against the security policy. As yet another example, the security setting management unit 332 may limit options that can be selected by the user according to the provision of the security policy to thereby prevent the user from selecting an option against the security policy.

An example of an information processing system according to a second exemplary embodiment of the present disclosure will be described. In the second exemplary embodiment, components substantially similar to those in the first exemplary embodiment are denoted by the same reference numerals as those in the first exemplary embodiment. In the second exemplary embodiment, differences from the first exemplary embodiment will be mainly described. Detailed descriptions of the components substantially similar to those in the first exemplary embodiment are omitted.

In the first exemplary embodiment described above, the environment of the network to which the MFP 100 is connected is identified based on the network environment information collected by the MFP 100. On the other hand, in the second exemplary embodiment, the management server 120 acquires network environment information from the MFP 100, and identifies the environment of the network to which the MFP 100 is connected based on the network environment information.

(Functional Configuration)

An example of a functional configuration of each of the MFP 100 and the management server 120 in the information processing system according to the present exemplary embodiment will be described with reference to FIG. 9.

The controller unit 101 in the MFP 100 according to the present exemplary embodiment differs from the controller unit 101 in the MFP 100 according to the first exemplary embodiment in that the MFP 100 includes a network environment information transmission unit 901 in place of the network environment identification unit 321 and the network environment identifier transmission unit 322.

The network environment information transmission unit 901 transmits the network environment information about the MFP 100 collected by the network environment information collection unit 320 to the management server 120.

The management server 120 according to the present exemplary embodiment differs from the management server 120 according to the first exemplary embodiment in that the management server 120 includes a network environment information acquisition unit 902 and a network environment identification unit 903 in place of the network environment identifier acquisition unit 401.

The network environment information acquisition unit 902 acquires the network environment information from the MFP 100.

The network environment identification unit 903 identifies the environment of the network to which the MFP 100 is connected based on the network environment information acquired by the network environment information acquisition unit 902.

(Processing)

An example of processing performed by the information processing system according to the present exemplary embodiment will be described with reference to FIGS. 10A and 10B, in particular, with a focus on processing to be performed on the MFP 100 when the security policy suitable for the environment of the network to which the MFP 100 is connected is delivered by the management server 120. FIG. 10A is a flowchart illustrating an example of processing performed by the management server 120. FIG. 10B is a flowchart illustrating an example of processing performed by the MFP 100.

First, an example of processing performed by the management server 120 will be described with reference to FIG. 10A. The processing performed by the management server 120 according to the present exemplary embodiment differs from the processing performed by the management server 120 according to the first exemplary embodiment in that the processing performed by the management server 120 according to the present exemplary embodiment includes processing of steps S1001 and S1002 in place of the processing of step S701.

In step S1001, the network environment information acquisition unit 902 acquires the network environment information (in other words, the network environment information collected by the MFP 100) indicating the environment of the network to which the MFP 100 is connected from the MFP 100 to be managed.

In step S1002, the network environment identification unit 903 identifies the environment of the network to which the MFP 100 is connected based on the network environment information about the MFP 100 acquired in step S1001.

The subsequent processing is substantially similar to that in the example described above with reference to FIG. 7A.

Next, an example of processing performed by the MFP 100 will be described with reference to FIG. 10B. The processing performed by the MFP 100 according to the present exemplary embodiment differs from the processing performed by the MFP 100 according to the first exemplary embodiment in that the processing performed by the MFP 100 according to the present exemplary embodiment includes processing of step S1011 in place of the processing of steps S712 and S713.

In step S711, the network environment information collection unit 320 collects the network environment information about the network to which the MFP 100 is connected at a given opportunity, for example, after the start of an operation of the MFP 100, or when an instruction is received from the user.

In step S1011, the network environment information transmission unit 901 transmits the network environment information collected in step S711 to the management server 120. After that, the MFP 100 waits for the delivery of the security policy from the management server 120.

The subsequent processing is substantially similar to that in the example described above with reference to FIG. 7B.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure has been described in detail above based on exemplary embodiments of the present disclosure. However, the present disclosure is not limited to the specific exemplary embodiments, and various modifications can be made without departing from the scope of the disclosure.

For example, the configuration corresponding to the management server 120 may be implemented by a plurality of apparatuses that operate in cooperation. As a specific example, some of a series of functions of the management server 120 may be implemented by another apparatus that has established communication with the management server 120. As another example, the load of processing for implementing at least some of the series of functions of the management server 120 may be distributed to a plurality of apparatuses. As yet another example, at least some of the series of functions of the management server 120 may be implemented as what is called network services.

According to an aspect of the present disclosure, a security policy can be applied to an information processing apparatus to be managed in a suitable mode depending on circumstances at different times.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-112600, filed Jul. 13, 2022, which is hereby incorporated by reference herein in its entirety.

What is claimed is:

1. An information processing system comprising:
a first information processing apparatus; and
at least one second information processing apparatus,
wherein the first information processing apparatus includes:
a processor; and
a memory storing instructions which, when executed by the processor, cause the first information processing apparatus to:
specify an environment of a network to which the second information processing apparatus is connected;
select a security policy associated with the environment of the network specified; and
deliver the security policy selected to the second information processing apparatus, and
wherein the second information processing apparatus includes:
a processor; and
a memory storing instructions which, when executed by the processor, cause the second information processing apparatus to:
receive the security policy associated with the environment of the connected network from the first information processing apparatus;
apply the security policy received; and
monitor a change in setting information about security, limit the change in the setting information upon detecting that the change in the setting information is against the security policy, and provide notification of information indicating a warning.

2. The information processing system according to claim 1,
wherein the processor of the second information processing apparatus further configured to:
collect network environment information about the environment of the connected network;
identify the environment of the connected network based on the network environment information collected; and transmit a network environment identifier indicating a result of identification of the environment of the connected network to the first information processing apparatus, and wherein the environment of the network to which the second information processing apparatus is connected is specified based on the network environment identifier transmitted from the second information processing apparatus.

3. The information processing system according to claim 2, wherein the network environment identifier is information indicating a result of the identification of the environment of the network to which the second information processing apparatus is connected based on a condition for security indicated by the network environment information.

4. The information processing system according to claim 2, wherein the network environment information includes setting information held in the second information processing apparatus, and identification information indicating an environment of a network, the identification information being acquired from a network device within the network to which the second information processing apparatus is connected.

5. The information processing system according to claim 2, wherein the security policy delivered to the second information processing apparatus includes a recommended value for setting information about security applied in the environment of the network to which the second information processing apparatus is connected, and a range of values with which the setting information is to be customized.

6. The information processing system according to claim 2, wherein the selection unit selects a security policy associated with the network environment identifier transmitted from the second information processing apparatus from among a series of security policies held in the first information processing apparatus.

7. The information processing system according to claim 2, wherein, in a case where a security policy held in the first information processing apparatus is changed, the delivery unit delivers the changed security policy to the second information processing apparatus that transmits the network environment identifier associated with the security policy to be changed.

8. The information processing system according to claim 2, wherein, in a case where the network environment identifier transmitted from the second information processing apparatus is changed, the selection unit selects a security policy associated with the environment of the network specified based on the changed network environment identifier.

9. The information processing system according to claim 2, wherein the processor of the second information processing apparatus further configured to limit selection of an option corresponding to an update against the security policy as an option for an update of the setting information about security.

10. The information processing system according to claim 1, wherein the processor of the second information processing apparatus further configured to:

collect network environment information about the environment of the connected network; and transmit the network environment information collected to the first information processing apparatus, wherein the processor of the first information processing apparatus further configured to acquire the network environment information from the second information processing apparatus, and wherein the environment of the network is specified by identifying the environment of the network to which the second information processing apparatus is connected based on the network environment information acquired.

11. The information processing system according to claim 1, wherein the second information processing apparatus is an image forming apparatus configured to form an image on a recording medium.

12. A control method for an information processing system including a first information processing apparatus and at least one second information processing apparatus, the control method comprising:

specifying, by the first information processing apparatus, an environment of a network to which the second information processing apparatus is connected;

selecting, by the first information processing apparatus, a security policy associated with the specified environment of the network;

delivering, by the first information processing apparatus, the selected security policy to the second information processing apparatus;

receiving, by the second information processing apparatus, the security policy associated with the environment of the connected network from the first information processing apparatus;

applying, by the second information processing apparatus, the received security policy; and monitoring a change in setting information about security, limit the change in the setting information upon detecting that the change in the setting information is against the security policy, and provide notification of information indicating a warning.

* * * * *